United States Patent
Kranenburg-Van Dijk et al.

(10) Patent No.: US 6,673,423 B2
(45) Date of Patent: Jan. 6, 2004

(54) INFORMATION-CARRYING MOULDED PART

(75) Inventors: Saskia I. Kranenburg-Van Dijk, Maastricht (NL); Franciscus W.M. Gelissen, Selfkant (DE); Markus J.H. Bulters, Sittard (NL); Christiaan Schröder, Geleen (NL)

(73) Assignee: DSM N.V., Heerlen (NL)

( * ) Notice: Subject to any disclaimer, the term of this patent is extended or adjusted under 35 U.S.C. 154(b) by 60 days.

(21) Appl. No.: 10/092,728

(22) Filed: Mar. 8, 2002

(65) Prior Publication Data

US 2002/0146549 A1 Oct. 10, 2002

Related U.S. Application Data

(63) Continuation of application No. PCT/NL00/00622, filed on Sep. 5, 2000.

(30) Foreign Application Priority Data

Sep. 10, 1999 (NL) .............................. 1013028

(51) Int. Cl.[7] .................. B32B 27/08; B32B 27/36; B32B 31/04; B32B 31/30; B32B 7/02
(52) U.S. Cl. ................. 428/203; 428/480; 428/412; 428/212; 428/217; 428/195; 428/201; 156/244.11; 156/244.16; 156/308.2; 264/173.11; 264/173.16
(58) Field of Search ................. 428/480, 412, 428/212, 217, 195, 201, 203; 156/244.11, 244.16, 308.2; 264/173.1, 173.16

(56) References Cited

U.S. PATENT DOCUMENTS

| | | | | |
|---|---|---|---|---|
| 3,871,119 A | * | 3/1975 | Mayer | ......................... 430/10 |
| 4,070,417 A | | 1/1978 | Isaka et al. | |
| 4,251,652 A | * | 2/1981 | Tanaka et al. | .............. 528/279 |
| 4,450,024 A | * | 5/1984 | Haghiri-Tehrani et al. | .. 156/108 |
| 4,636,442 A | * | 1/1987 | Beavers et al. | ............. 428/480 |
| 5,055,345 A | * | 10/1991 | Wank et al. | ................ 428/215 |
| 6,091,491 A | * | 7/2000 | Chisholm et al. | ........... 356/301 |
| 6,169,131 B1 | * | 1/2001 | Goertz et al. | ............... 524/101 |
| 6,372,394 B1 | * | 4/2002 | Zientek | ....................... 430/10 |

FOREIGN PATENT DOCUMENTS

| WO | 9737849 | 10/1997 |
|---|---|---|
| WO | WO 01/85451 A1 * | 11/2001 |

* cited by examiner

Primary Examiner—Vivian Chen
(74) Attorney, Agent, or Firm—Pillsbury Winthrop LLP

(57) ABSTRACT

The invention relates to an information-carrying molded part containing one or more plastic layers, at least one of which bears an informative representation. A 'molded part' is understood to be in particular a card such as 'smart cards', key cards, identification cards, telephone cards, credit cards or bank cards. According to the invention at least one of the plastic layers herein is made from a block-copolyester consisting of soft blocks of a flexible polymer and hard polyester blocks of repeating units of at least one alkylene glycol and at least one aromatic dicarboxylic acid or an ester thereof. The block-copolyether layer can very well be provided with an informative representation with the aid of laser writing and for example sublimation printing. The information-carrying molded part according to the invention also has a good stiffness combined with a good flexibility and a good resistance to breaking and tearing, good adhesion to for example polycarbonate. PVC-free cards can be made which do not threaten the environment.

32 Claims, No Drawings

INFORMATION-CARRYING MOULDED PART

CROSS REFERENCE TO RELATED APPLICATION

This is a Continuation of International Application No. PCT/NL00/00622 filed Sep. 5, 2000 which designated the U.S. and was published in the English language. The contents of this PCT application are incorporated in their entirety by reference.

The invention relates to an information-carrying molded part containing one or more plastic layers, at least one of which bears an informative representation. In particular, a 'molded part' is understood to be a card, but it is not limited thereto. Known information-carrying cards are for example 'smart cards', key cards, identification cards, telephone cards, credit cards or bankcards. Other moulded parts could be for example rods, strips, sepp keys, etcetera. An 'informative representation' is understood to be for example a text, a bar code or other optionally encrypted information, or a photo or an illustration. Also other, e.g. decorative representations are generally present on such parts, including company names or logos, background illustrations, etc.

Such information-carrying moulded parts have so far been made predominantly from polyvinylchloride compositions (PVC). This material is especially favoured in this application because it has a good stiffness and because it shows favourable printability, for example by using sublimation printing techniques. A major drawback of a PVC card, however, is that it shows limited resistance to bending and insufficient flexibility. Especially at comparatively low temperatures, a PVC card is very brittle and will easily break. PVC cards moreover often fail in those places where an electronic chip has been incorporated in the layer, or where letters or symbols have been embossed. At higher temperatures PVC cards generally display poor dimensional stability. An additional problem is that plasticisers used in softened PVC may migrate in and out of the PVC layer, as a result of which the properties of the moulded part may change in time and its life-time is limited. Another disadvantage is that representations printed on PVC have insufficient resistance to scratching. The aforementioned PVC problems are usually solved in practice by providing both sides of the PVC layer with further layers. EP-B-0430282, for example, describes an information-carrying card consisting of a stiff core layer which is essentially provided with outer layers, with in between the core and outer layer a layer of a thermoplastic elastomer for providing adhesion and for improving the flexibility and resistance to bending. In particular, mention is made of a card consisting of a PVC or polycarbonate (PC) core layer with polycarbonate outer layers and thermoplastic polyurethane (TPU) as adhesive layers. When PVC is used as the core layer the greatest disadvantage is not yet eliminated, and the cards have to be separately collected and processed after use, in order to prevent pollution of the environment with PVC. The embodiment with polycarbonate as a core layer presents the disadvantage that it is practically impossible to print on polycarbonate using sublimation techniques. Another disadvantage of the aforementioned cards is that they are fairly complex and hence expensive. EP-B-0430282 describes a PVC-free information-carrying card consisting of a core layer of a TPU with PC outer layers, but a disadvantage is that the TPU layer cannot be provided with information. Another disadvantage is that this structure can actually only be used in very thin cards. As TPU generally has a low crystallisation rate, a thicker TPU layer will acquire dimensional stability only after prolonged waiting times.

The aim of the invention is to provide an information-carrying moulded part that does not show the aforementioned disadvantages, or at least shows them to a lesser extent.

This aim is achieved with an information-carrying moulded part, in which at least one of the plastic layers is made from a block-copolyester consisting of soft blocks of a flexible polymer and hard polyester blocks with repeating units derived from at least one alkylene glycol and at least one aromatic dicarboxylic acid or an ester thereof.

Surprisingly it has been found that the information-carrying moulded part according to the invention has a good stiffness and hardness, combined with a good flexibility and a good resistance to breaking and tearing and a long life-time under varying conditions of mechanical loading, temperature and humidity. These advantages are manifest in the moulded part irrespective of whether it has a single- or multi-layer structure. Thanks to the aforementioned properties, the block-copolyester layer is also very suitable for containing an electronic chip (also shortly named chip) and the information-carrying moulded part can have a simpler structure. Another advantage is that the direct adhesion of the block-copolyester to for example polycarbonate is good, as a result of which these layers can be combined in a multi-layer structure without an intermediate layer of adhesive. A great advantage is that the block-copolyester, unlike PVC, is not considered to be a threat to the environment.

In WO-A-97/37849 also a multi-layer card containing a block-copolyester is described, but not as a separate block-copolyester layer. In this publication block-copolyester is used only up to 30 wt. % as a blend component in a polyester substrate layer, in order to reduce delamination phenomena between the substrate layer and ink-receptive and/or cover layers.

Another major advantage of the present invention is that the block-copolyester layer, unlike many other materials frequently used in this application such as the aforementioned TPU, PBT, PET and PC, can be provided with an informative representation using printing techniques such as sublimation printing. The representation is rich in contrast and, because the pigments penetrate very deep into the block-copolyester layer, it is very wear-resistant. It is also very well possible to write on the block-copolyester layer with a laser. For this purpose the block-copolyester may also contain additives to further improve its laser-markability. Surprisingly, it has been found that the block-copolyester layer can well adhere to for example a polycarbonate layer without a layer of adhesive even if it carries a representation such as a sublimate print. This makes it more difficult to forge information-carrying moulded parts, in particular cards. The information-carrying moulded part according to the invention therefore preferably carries an informative representation on a block-copolyester layer. A multi-layer structure may also bear representations on other layers in the information-carrying moulded part. In general, especially individualised information, such as a photo and/or textual, optionally encrypted, information concerning the holder or owner of the information-carrying moulded part, will preferably be borne on the block-copolyester layer. General representations, such as brand or company names, logos or decorative representations, may be applied to the same block-copolyester layer or to a different layer. The latter may be advantageous in the case of mass-production of a card.

Although a large number of advantages of the invention are also evident in a multi-layer structure that can also include a PVC layer, the information-carrying moulded part according to the invention is preferably free of polyvinylchloride (PVC), as a result of which the information-carrying moulded part needs no longer be separately collected and reprocessed or destroyed after its use.

The hard polyester blocks in the block-copolyester consist of repeating units derived from at least one alkylene glycol and at least one aromatic dicarboxylic acid or an ester thereof. It has been found that, with respect to their use in the information-carrying moulded parts, the thermoplastic block-copolyesters have many advantages over other thermoplastic elastomers such as the thermoplastic polyurethanes, block copolyamides and the like because of their better mechanical properties, such as in particular the better stiffness, dimensional stability and resistance to moisture and the better printability. The alkylene group generally contains 2–6 C atoms, preferably 2–4 C. Preferable for use as the alkylene glycol are ethylene glycol, propylene glycol and in particular butylene glycol. Terephthalic acid, 1,4-naphthalenedicarboxylic acid, 4,4'-diphenyldicarboxylic acid are very suitable for use as the aromatic dicarboxylic acid. Combinations of these dicarboxylic acids, and/or other dicarboxylic acids such as isophthalic acid may also be used. Their effect is to influence the crystallisation behaviour, e.g. melting point, of the hard polyester blocks.

The soft blocks in the block-copolyester consist of a flexible polymer. This is understood to mean blocks of a polymer that has a low glass transition temperature and a low stiffness. In principle many different polymers can be used to that end. Preferably, however, the soft block in the block-copolyester is an aliphatic polyester or polyether. A particular advantage of this is that it is very well possible to write on the information-carrying moulded part with the aid of a laser and to print on it with standard printing techniques, including sublimation printing. To this end especially aliphatic polyethers are preferred as the soft block. The moisture sensitivity and the adhesive properties are moreover very good.

The block-copolyester may also contain one or more of the usual additives, pigments and processing aids. Preferably the block-copolyester layer in the moulded part according to the invention also contains an additive for improving its laser-markability.

Preferably the soft blocks in the block-copolyester consist of a polyether derived from polyalkeneoxide glycol. As the polyalkyleneoxide glycol use can be made of for example polybutyleneoxide glycol, polypropyleneoxide glycol, polyethyleneoxide glycol, ethyleneoxide-terminated polypropyleneoxide glycol or combinations thereof. Examples and the preparation of block-copolyether esters are for example described in the Handbook of Thermoplastics, ed. O. Olabishi, Chapter 17, Marcel Dekker Inc., New York 1997, ISBN 0-8247-9797-3, Thermoplastic Elastomers, 2nd Ed., Chapter 8, Carl Hanser Verlag (1996), ISBN 1-56990-205-4, and the Encyclopedia of Polymer Science and Engineering, Vol. 12, pp.75–117, and the references contained therein.

Most preferably the block-copolyester in the information-carrying moulded part according to the invention is a block-copolymer containing polybutyleneterephthalate hard blocks and poly(oxytetramethylene) terephthalate soft blocks.

The ratio of the soft and hard blocks in the block-copolyester may generally vary within a wide range but is in particular chosen in view of the desired hardness of the block-copolyester. The desired hardness will depend on the structure of the information-carrying moulded part and the functionality of the block-copolyester layer in it. Generally a higher soft block content results in higher flexibility and better toughness, especially at low temperatures. A higher soft block content was also found to improve the printability of a moulded part.

In one embodiment of the information-carrying moulded part according to the invention there is a block-copolyester layer with a hardness of at least 50 Shore D on one outside of the moulded part. This may be in a single- or in a multi-layer structure. The advantage of this embodiment is that the surface of the moulded part is wear-resistant, that the layer, in a multi-layer structure, adheres very well to the next layer in the case of different materials, in particular also in the case of other block-copolyester layers, and that the moulded part has a good stiffness. Another advantage is that the moulded part is directly accessible for the application of an informative representation, in particular a sublimation print, and that the representation is very resistant to wear and scratching. In this respect the hardness is preferably at least 60, more preferably at least 65 and most preferably at least 70 Shore D. A particular embodiment of this invention is an information-carrying moulded part that consists of one layer of a block-copolyester with a hardness of at least 50 Shore D, on which an informative representation has been applied. Because of its simple structure, this embodiment is of relatively low cost, free of PVC, and nevertheless combines very good printability and favourable mechanical properties.

In a multi-layer embodiment of the information-carrying moulded part according to the invention in which all the plastic layers are block-copolyester layers, at least one layer must have a hardness of at least 50 Shore D so that the moulded part has sufficient stiffness. Preferably the hardness of this layer is therefore at least 60 Shore D. The plastic layers in this embodiment may be made from different or from the same block-copolyesters. In view of the dimensional stability of the moulded part it is advantageous to use two or more block-copolyester layers, even if they are of the same block-copolyester.

In another particular embodiment of the information-carrying moulded part according to the invention the plastic layer on one outside of the moulded part is a layer of a block-copolyester with a hardness of at least 50, preferably at least 60 Shore D, and the inside layer joined to it consists of a block-copolyester with a hardness lower than that of the outside, preferably less than 50 Shore D. An advantage of this embodiment is that the card is very flexible and nevertheless resistant to scratching and wear. Another advantage of the soft block-copolyester inside layer is that, because of its lower processing temperatures, it allows the use of a much wider range of additives for e.g. improving the laser-markability, in particular colour-forming substances. Preferably the soft block-copolyester inside layer contains an additive for improving the laser-markability, in particular a radiation sensitive dye or pigment. The moulded part may in addition also contain layers of a different material, but it may also consist entirely of block-copolyesters.

In a special embodiment according to the invention the soft block-copolyester inside layer itself is a multi-layer construction, e.g. a harder block-coplyester sandwiched between two layers of soft block-copolyester. The advantage of such a construction is that the properties discussed above can be optimised.

The soft block-copolyester layer in the information-carrying moulded part can for example be obtained by using a block-copolyester with a higher amount of soft blocks, in particular a higher content and a larger number of soft blocks. In the information-carrying moulded part according to the invention, the soft layer however preferably consists of a block-copolyester with hard blocks derived from, in addition to the aromatic dicarboxylic acid or an ester thereof, a minority proportion of a second aromatic dicarboxylic acid or an ester thereof. Preferably the hard blocks then consist of polybutyleneterephthalate modified with isophthalic acid. The advantage of this is that the processing temperature is markedly lower while the hardness has not been proportionally lowered. The soft block-copolyester layer can consequently contain a much larger number of different additives, e.g. for laser marking while still having a good stiffness. To this end the processing temperature is preferably below 190, more preferably below 180 and even more preferably below 170° C.

In a multi-layer embodiment of the information-carrying moulded part according to the invention it has on one or both outsides, viewed from outside inwards, a transparent outer layer and at least an inside layer consisting of a block-copolyester bearing an informative representation. A transparent layer is also understood to include a translucent layer, and may be colourless or have a light colour, as long as the information carried on an inner layer is readily, either with the naked eye or with some device. The advantage of the transparent outer layer is that it protects the representation applied to the inside layer of a block-copolyester against for example fouling, wear and forgery. Different materials can be used for the transparent outer layer, such as polycarbonate, polyesters like polyethyleneterephthalate (PET) or its copolymers, polyolefines, PVC or, as also described above, a block-copolyester with a hardness of at least 50, preferably at least 60 Shore D. In view of wear resistance, thermal stability and adhesion aspects, the outer layer is preferably of polycarbonate. In view of material recovery and recycling of end-of-life parts an all block-copolyester moulded part is preferred. In addition to the above materials as transparent outer layers that are generally coextruded or laminated on an inner layer, also a transparent coating layer may have been applied as outer layer.

As already mentioned above, a particular advantage of the block-copolyester inside layer is its very good adhesion to different materials, even in the presence of a representation on it. This property is expressed in a high peel strength for the different layers. Preferably the peel strength is higher than 6 N/cm, measured according to ISO/IEC standard 7810. In a particular embodiment the transparent outer layer, in particular a PC outer layer, has been applied directly to the block-copolyester layer without an intermediate layer of adhesive. This leads to a substantial saving in costs. It has been found that the adhesion is then better if the block-copolyester inside layer consists of a soft block-copolyester with a hardness of less than 50 Shore D. As described above, an additional advantage of this is that a larger number of different substances are suitable for use as a laser marking additive in the soft layer because of its lower processing temperature. In view of the stiffness of the moulded part, there is in the latter embodiment, preferably on the inside of the soft block copolyester layer, a layer provided with a block-copolyester with a hardness higher than 50 Shore D.

Besides with the represented information, the information-carrying moulded part can be provided with further information carriers, for example a magnetic strip or a chip. Preferably the information-carrying moulded part according to the invention contains a chip installed in or on a block-copolyester layer with hardness higher than 50 Shore D. The advantage is that the chip can be excellently adhered to the block-copolyester layer, preferably with a layer of adhesive. The chip can consequently not be removed without damage, which is advantageous for reasons of security. It has also been found that a disadvantage of many state-of-the-art cards, i.e. tearing or breaking of the cards at or in the vicinity of the chip or magnetic strip, after frequent use, occurs to a much lesser extent with the moulded part according to the invention.

Preferably an essentially symmetrical structure is chosen for a multi-layer structure of the moulded part according to the invention, especially in case of cards. This is understood to mean that essentially the same layers (excluding layers of adhesive) are to be found above and below the middle of the moulded part. For example: PC/block-copolyester (BCPE)/PC, hard BCPE/soft BCPE/hard BCPE, PC/soft BCPE/hard BCPE/soft BCPE/PC, PC/soft BCPE/hard BCPE/hard BCPE/soft BCPE/PC, hard BCPE/soft BCPE/PC/soft BCPE/hard BCPE, hard BCPE/soft BCPE/hard BCPE/soft BCPE/hard BCPE, hard BCPE/PVC/hard BCPE.

For making multi-layer information-carrying moulded parts preferably different polymers of the same polymer family, e.g. all polyesters, or at least different polymers that are mutually compatible, e.g. polycarbonate and block-copolyesters, are used. The advantage hereof is that after use the parts may be reprocessed as such, e.g. compounded into plastic compositions for use as injection moulding grades for technical parts. This will not only provide an environmentally sound outlet for end-of-life cards, but also a very secure route for destroying the generally confidential information contained in such cards.

A problem of the known information-carrying moulded parts, for example cards, is that they are rather slippery, especially in the presence of moisture. They can consequently easily slip from a wallet or be stolen, and they feel slippery, especially to moist or wet hands. These disadvantages are eliminated in a very particular embodiment of the information-carrying moulded part according to the invention in which an anti-slip layer of a block-copolyester, preferably with a hardness of less than 50 Shore D, more preferably less than 40 Shore D, has been applied to, at least, part of the surface of one outside of the moulded part. Preferably the hardness is higher than 25 Shore A. Preferably this layer is provided with a surface texture. Such a layer has a pleasant soft touch and has a greater friction resistance, as a result of which the information-carrying moulded parts do not slip from their holder and become lost as easily. The aforementioned solution is incidentally not exclusively restricted to the information-carrying moulded parts according to the invention. This invention relates to all moulded parts, in particular information-carrying moulded parts in which a block-copolyester with a hardness of between 25 Shore A and 80 Shore D has been applied to, at least, part of the surface of one outside of the moulded part. Preferably the layer has been applied to only that part of the surface where the moulded part is in frictional contact during use (grip-pad or slip-pad), for example where it is held when a card is passed through a card scanner. Another example is a compact disc, to the surface of which that is in frictional contact during use, for example with a rotating driving holder, a preferably textured layer of a block-copolyester with a hardness of between 25 and 80 Shore D has been applied.

The invention also relates to the use of the information-carrying moulded part according to the invention as a card, preferably as a key card, identification card, telephone card, credit card, bank card, driving licence, insurance card, membership card, smart card, etc.

The invention also relates to the use of block-copolyesters as a layer in single- or multi-layer information-carrying moulded parts, in particular cards, because of their particular suitability for this application.

The information-carrying moulded part according to the invention, in particular an information-carrying card, can be produced in many different ways. Known techniques are (co-)injection moulding, (co-)extrusion moulding, or lamination. 'Lamination' is understood to be combining two or more preformed, e.g. extruded, layers into a composite layer, whether or not in the presence of intermediate layers of adhesive, under the influence of elevated pressure and/or temperature. In the case of making cards by lamination and extrusion the moulded part must still be cut or punched to the required dimensions from a moulded part of larger dimensions. Informative representations can be applied before or after the moulded part has acquired its definitive shape.

In a process for the production of an information-carrying moulded part according to the invention two or more plastic layers, among which is a block-copolyester layer to which an informative representation has been applied, are formed into a laminate. Generally a layer of adhesive can be used between the layers for obtaining good adhesion, but this is not necessary. Preferably a scratch-resistant material like PC is then used as the outside layer on top of a block-copolyester layer to which an informative representation has been applied. In another process two or more plastic layers, among which is a block-copolyester layer, are formed into a laminate, after which an informative representation is applied to a block-copolyester layer of the laminate. General representations, such as brand or company names, logos or decorative representations, are in the case of lamination preferably applied before the plastic layers have been formed into a laminate. This may be advantageous in the mass-production of a card. Individualised information, such as a photo and/or textual information concerning the holder of the information-carrying moulded part, is preferably applied to the block-copolyester layer or other layer after the moulded part has acquired its definitive shape. The advantage of the block-copolyester layer in the moulded part over the known materials such as PVC, ABS and TPU is that, with an outer layer of for example PC, block-copolyester or PVC, the lamination can be effected at much higher temperatures, resulting in better adhesion between the layers. Preferably the temperature is then between 140 and 300, more preferably between 150 and 240, and most preferably between 160 and 220° C. In a particular embodiment an outer layer and a block-copolyester layer are laminated directly, without a layer of adhesive, even in the case of the presence of a representation on the block-copolyester layer. Good adhesion of layers is found, when the laminating temperature is upto about the melting point of block-copolyester layer or layers that are to be adhered. Therefore, in multi-layer constructions, the block-copolyester layers that are to be adhered upon lamination preferably have a lower melting point than the other layers. This has the advantage that during the lamination the heating has no detrimental effects on the layers, such as undesired melting of a layer or damaging of the information carried on a layer. In a preferred embodiment of the process according to the invention, a three-layer co-extruded block-copolyester of construction UHIL, in which L is a block-copolyester that has a melting point lower than block-copolyester H, is laminated to, for example, an extruded PC layer in the vicinity of the melting point of L. In another embodiment, the said LUH/L construction is laminated to another block-copolyester layer of construction H/L1, wherein L and L1 have the same or similar melting points and are brought in direct contact.

As already described above, thanks to the special properties of the block-copolyester layer in the information-carrying moulded part according to the invention, simpler structures can be made while retaining the properties required for the application. Especially in the case of low-cost cards consisting of one or two layers, the information-carrying moulded part is preferably produced by means of injection-moulding, after which an informative representation is applied to the block-copolyester layer of the moulded part. A protective layer, for example containing a UV filter to protect the pigments in the representation, can subsequently optionally be applied to the injection-moulded moulded part. This protective layer can be applied using various techniques, including for example injection moulding, laminating, or coating.

In another embodiment of the process for the production of an information-carrying moulded part according to the invention, the moulded part is with comparable advantages produced by co-extruding two or more layers, after which an informative representation is applied to a block-copolyester layer (before or after obtaining the definitive shape).

A specially preferred embodiment concerns a process for the production of an information-carrying moulded part according to the invention in which a transparent outer layer is co-extruded onto a block-copolyester layer to which an informative representation has been applied. The outer layer may then be of PC, PET, block-copolyester or PVC. Surprisingly, it has been found that the outer layer can in this way be applied to the block-copolyester layer without the representation applied to this layer being seriously affected, as long as the temperature is adequately controlled, for example by cooling directly after applying the outer layer. It is moreover surprising that excellent adhesion between the layers is obtained in this way, without the use of a layer of adhesive.

What is claimed is:

1. An information-carrying card containing one or more plastic layers, at least one of which bears an informative representation, wherein at least one of the plastic layers consists essentially of a block-copolyester consisting of soft blocks and hard polyester blocks with repeating units derived from at least one alkylene glycol and at least one aromatic dicarboxylic acid or an ester thereof.

2. The information-carrying card according to claim 1, wherein an informative representation has been applied to a block-copolyester layer.

3. The information-carrying card according to claim 1, wherein the moulded part is free of polyvinylchloride (PVC).

4. The information-carrying card according to claim 1, wherein the soft blocks consist of a polyether derived from a polyalkeneoxide glycol.

5. The information-carrying card according to claim 1, wherein the block-copolyester is a block-copolymer containing polybutyleneterephthalate blocks and poly(oxytetramethylene)terephthalate blocks.

6. The information-carrying card according to claim 1, wherein a block-copolyester layer with a hardness of at least 50 Shore D is on an outside of the moulded card.

7. The information-carrying card according to claim 6, wherein the block-copolyester layer on an outside of the moulded card has a hardness of at least 60 Shore D.

8. The information-carrying card according to claim 1, wherein there are at least two plastic layers and the plastic layers are all block-copolyester layers, at least one of which layers has a hardness of at least 50 Shore D.

9. The information-carrying card according to claim 1, wherein the moulded card consists of a single block-copolyester layer with a hardness of at least 50 Shore D to which an informative representation has been applied.

10. The information-carrying card according to claim 1, wherein, on one or both outsides, viewed from outside inwards, it has a transparent outer layer and an inside layer consisting of a block-copolyester bearing an informative representation.

11. The information-carrying card according to claim 10, wherein the outer layer has been applied directly to the block-copolyester inside layer without an intermediate layer of adhesive.

12. The information-carrying card according to claim 10, wherein the block-copolyester inside layer consists of a soft block-copolyester with a hardness of less than 50 Shore D.

13. The information-carrying card according to claim 12, wherein, on the inside of the soft block-copolyester inside layer, is a layer consisting of a block-copolyester with a hardness of more than 50 Shore D.

14. The information-carrying card according to claim 1, wherein the block-copolyester layer contains additives for improving the laser-markability.

15. The information-carrying card according to claim 1, wherein, the hard blocks in the block-copolyester are derived from, in addition to the aromatic dicarboxylic acid or an ester thereof, a minority proportion of a second aromatic dicarboxylic acid or an ester thereof.

16. The information-carrying card according to claim 15, wherein the hard blocks consist of polybutyleneterephtha-late modified with isophthalic acid.

17. The information-carrying card according to claim 1, wherein an anti-slip layer consisting of a block-copolyester with a hardness of less than 50 Shore D has been applied to, at least, part of the surface of an outside of the moulded card.

18. The information-carrying card according to claim 1 which is a key card, identification card, telephone card, credit card, bank card, driving license, insurance card, membership card or smart card.

19. A process for the production of an information-carrying card according to claim 1, wherein two or more plastic layers, including a block-copolyester layer bearing an informative representation, are formed into a laminate.

20. A process for the production of an information-carrying card according to claim 1, wherein two or more plastic layers, including at least one block-copolyester layer, are formed into a laminate, after which an informative representation is applied to the block-copolyester layer of the laminate.

21. A process for the production of an information-carrying card according to claim 1, wherein the moulded card is produced by means of injection-moulding, after which an informative representation is applied to the block-copolyester layer of the moulded card.

22. A process for the production of an information-carrying card according to claim 1, wherein the moulded card is produced by co-extruding two or more layers, after which an informative representation is applied to the block-copolyester layer.

23. A process for the production of an information-carrying card according to claim 1, wherein co-extrusion is used to apply a transparent outer layer to a block-copolyester layer bearing an informative representation.

24. The process according to claim 23, wherein the outer layer consists of polycarbonate.

25. A method for making an information carrying card as set forth in claim 1, comprising molding a first layer of a composition consisting essentially of block copolyester, optionally applying one or more additional plastic layers to said first layer, and providing an informational representation on at least one said plastic layer.

26. The information-carrying card according to claim 1, wherein the information is applied by sublimation printing on a layer of said block copolyester.

27. The information-carrying card according to claim 1, wherein the information is applied by laser marking a layer of said block copolyester.

28. The information-carrying card according to claim 1, wherein at least one plastic layer consisting essentially of said block-copolyester includes one or more additives, pigments and processing aids.

29. An information-carrying moulded part, containing one or more plastic layers, at least one of which bears an informative representation, wherein at least one of the plastic layers is a block-copolyester consisting of soft blocks and hard polyester blocks with repeating units derived from at least one alkylene glycol and at least one aromatic dicarboxylic acid or an ester thereof, wherein, on one or both outsides, viewed from outside inwards, it has a transparent outer layer and an inside layer consisting of a block-copolyester bearing an informative representation and wherein it contains a chip mounted in or on a block-copolyester layer with a hardness of more than 50 Shore D.

30. The information-carrying molded part according to claim 29, which is a card.

31. A method for displaying information on a card, comprising, providing a card containing one or more plastic layers, at least one of the layers consisting essentially of a block-copolyester consisting of soft blocks and hard polyester blocks with repeating units derived from at least one alkylene glycol and at least one aromatic dicarboxylic acid or an ester thereof, and, optionally, one or more additives, and applying an informational representation on at least one plastic layer.

32. A method for displaying information, comprising, providing an informational representation on a single, or multi-layer molded part, in the form of a card, wherein at least one layer of the molded part consists essentially of a block-copolyester consisting of soft blocks and hard blocks.

* * * * *